Aug. 30, 1932.    W. O. HEBLER    1,874,520
GAS ANALYSIS APPARATUS
Filed Nov. 8, 1929

INVENTOR
William O. Hebler
BY
Frank C. Fischer
ATTORNEY

Patented Aug. 30, 1932

1,874,520

UNITED STATES PATENT OFFICE

WILLIAM O. HEBLER, OF NEWARK, NEW JERSEY, ASSIGNOR TO CHARLES ENGELHARD, INC., OF NEWARK, NEW JERSEY, A CORPORATION OF NEW JERSEY

GAS ANALYSIS APPARATUS

Application filed November 8, 1929. Serial No. 405,587.

This invention relates to gas analysis apparatus, and more particularly to thermal conductivity units for use in such apparatus.

There are various forms of gas analysis apparatus of the chemical and electrically operated type, such for example, as is described in Bureau of Standards Technologic Paper No. 249. Such devices are extremely accurate and are desirable in certain industrial processes where precise determinations are necessary.

However, there are numerous cases in which extreme accuracy of measurement is not necessary, and in such cases, the apparatus referred to above is objectionable because of its high cost.

It is an object of this invention to provide a gas analyzing device capable of accurate determinations, and which may be produced at a relatively low cost.

This and other objects are attained by the novel construction, combination and arrangement of parts hereinafter described and shown in the accompanying drawing, constituting a material part of this disclosure and in which.

Figure 1:
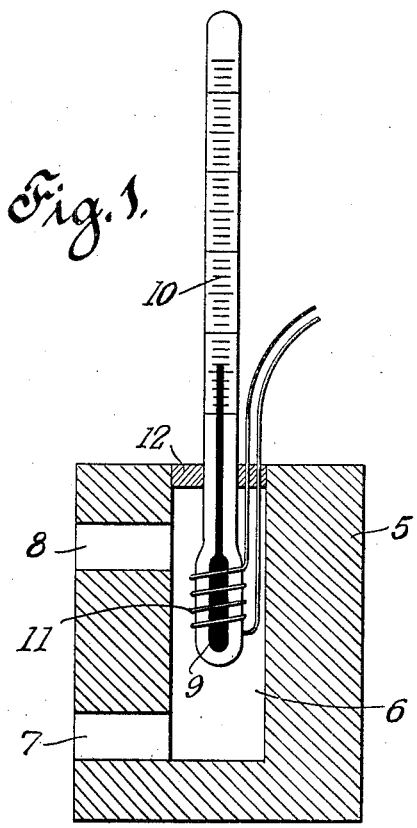
Figure 1 represents a sectional view of the device.

Referring to Figure 1 of the drawing, the gas analysis device is shown to include a thermal conductivity cell 5, formed preferably from a metal having a high coefficient of thermal conductivity, such as copper. The cell 5 is provided with a chamber 6, into which opens an inlet passage 7 and an outlet passage 8.

Positioned in the chamber 6, in any desired or convenient manner, is a mercury thermometer 9 having a graduated portion 10 extending above the cell, the thermometer being rigidly held in the cell by means of a cap 12 of plastic material, which hermetically seals the chamber 6.

The bulb portion of the thermometer in which the mass of mercury is contained, is surrounded by a heating element 11, in any desired or convenient manner, and preferably comprises a coil of wire having high electrical resistance, this wire being connected to an external source of electrical current having a constant potential. (Not shown).

In operation, the mercury is heated by the heating element 11, and air is passed through the chamber 6, air being used as the standard gas for comparison purposes. The rise of the mercury in the thermometer under such conditions is noted, and this point on the scale establishes the zero position.

Now, when some other gas is passed through the chamber 6, such as hydrogen which has a thermal conductivity coefficient of 7, the heat from the heating element will be conducted to the walls of the cell 5 at a rate seven times greater than it was when air was used, and consequently, the mercury in the thermometer will be greatly cooled, and will fall, the amount of the fall of the mercury depending upon and indicating the degree of purity of the gas.

That is, the rise and fall of the column of mercury is in exact proportion to the percentage of gas going through the chamber 6, and the thermometer is accordingy calibrated in direct percentage of gas.

Figure 2:
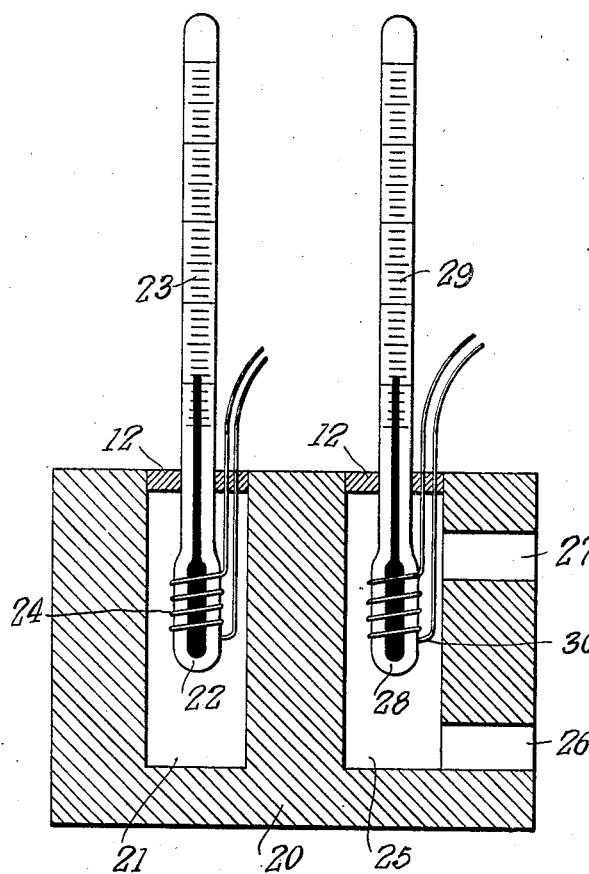
Figure 2 represents a sectional view of a modified form of the device.

In Figure 2 is shown a modified form of the device in which a thermal conductivity unit 20 has two chambers 21 and 25. Chamber 21 has sealed therein a standard gas, such as air, which surround a thermometer 22 and heating element 24, the thermometer being provided with a graduated portion 23 extending above the unit.

Chamber 25 communicates with inlet and outlet passages 26 and 27, and has mounted therein a similar thermometer 28, with a graduated portion 29 and a heating element 30.

The heating elements 24 and 30 have substantially the same characteristics, and when the same amount of current is passed through them, they give off substantially equal amounts of heat.

When the heating elements are placed in operation, the columns of mercury in the thermometers will rise to certain levels. The mercury in thermometer 22 will show a definite rise because it is sealed in air.

The mercury in thermometer 28 will be subjected to a flow of the gas being analyzed, for example, hydrogen; and the heating element 30 is rapidly cooled, and there will be a difference in the height of the two mercury columns. This difference in height is a direct indication of the percentage of the gas, such as hydrogen, passing through chamber 25.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. A device for analyzing gases by the thermal conductivity method, comprising a metal block having a chamber communicating with inlet and outlet passages, a liquid thermometer having a portion positioned in the chamber and a graduated portion extending above the cell, and a heating element associated with the portion of the thermometer in the cell.

2. A device for analyzing gases by the thermal conductivity method, comprising a metal block having a chamber communicating with inlet and outlet passages, a mercury thermometer having a portion positioned in the chamber and a graduated portion extending above the cell, and means for heating the portion of the thermometer in the cell.

3. A device for analyzing gases by the thermal conductivity method, comprising a metal block having a chamber communicating with inlet and outlet passages, a mercury thermometer having a portion positioned in the chamber and a portion extending above the cell, and means for heating the portion of the thermometer in the cell.

This specification signed this first day of November, 1929.

WILLIAM O. HEBLER.